United States Patent [19]

Maeser et al.

[11] Patent Number: 4,803,652

[45] Date of Patent: Feb. 7, 1989

[54] PORTABLE TRANSCEIVER

[76] Inventors: William C. Maeser, 4425 N. 78th St., B-233, Scottsdale, Ariz. 85251; Ward W. Maeser, 2093 E. 10th St., Tempe, Ariz. 85281

[21] Appl. No.: 913,743

[22] Filed: Sep. 30, 1986

[51] Int. Cl.⁴ .............................................. G06F 1/00
[52] U.S. Cl. .................................................. 364/708
[58] Field of Search .................... 364/200, 900, 208

[56] References Cited

U.S. PATENT DOCUMENTS

| 4,617,640 | 10/1986 | Kishi et al. | 364/708 |
| 4,669,053 | 5/1987 | Krenz | 364/708 |
| 4,680,674 | 7/1987 | Moore | 364/708 |
| 4,698,782 | 10/1987 | Ng et al. | 364/708 |
| 4,703,160 | 10/1987 | Narishima et al. | 364/708 |

Primary Examiner—Gareth D. Shaw
Assistant Examiner—John G. Mills, III
Attorney, Agent, or Firm—Nissle & Leeds

[57] ABSTRACT

A portable computer terminal device. The terminal device includes data input means which is psychologically acceptable to physicians, lawyers and other professionals and includes a carrying case of unusually lightweight and compact construction. Data stored in the terminal device can be printed on multiple sheet business forms. The data can also be displayed by projecting a CRT light beam on a collapsible, high resolution screen carried in the terminal device.

2 Claims, 3 Drawing Sheets

PORTABLE TRANSCEIVER

This invention relates to a portable terminal device carried by an individual to a site to transmit and/or receive data to and from a central unit through a telephone line or other communication means originating at the site.

More particularly, the invention relates to a portable terminal device which can be carried by a solicitor to a customer site to transmit and/or receive data to and from a central unit through a telephone set at the customer site to refer goods and prepare an agreement with and confirm an order by a customer.

In a further respect, the invention relates to a portable terminal device including a briefcase of unusually lightweight, sturdy construction which, by efficiently absorbing forces generated by a blow against the briefcase, protects electronic components carried in the briefcase.

In another respect, the invention relates to a lightweight compact portable terminal device which reproduces with high resolution on a screen data entered in the terminal device.

In still a further respect, the invention relates to a portable terminal device which permits data to be rapidly entered in the memory of the portable terminal device without the utilization of conventional keyboard data entry systems.

In yet a further respect, the invention relates to a portable terminal device which permits an order confirmation to be printed on a multiple page business form.

During a normal sales call, a solicitor takes an order and, after leaving the office of the customer, files at the solicitor's place of business a document containing information concerning the order. After receiving this document, the solicitor's company then prepares a multiple sheet order document. One of the sheets of the order document is forwarded to the customer as confirmation of the customer's order. The other sheets of the document are utilized in processing the order. This process for taking and confirming a customer's order provides ample chance for transcription errors during transfer of information from the solicitor's document to the company order document. Such transfer of information is typically accomplished by a clerk utilizing a word processor or other machine in which a keyboard is utilized to enter information. Keyboard operators incorrectly enter an average of 15% of data being transcribed.

Portable terminal systems are well known in the art. See, for example, U.S. Pat. No. 4,511,970 to Okano et al. Such prior art terminal systems have various practical disadvantages. Information often is entered in prior art terminal systems with a keyboard. As noted above, a substantial portion of information is incorrectly transcribed when a keyboard is utilized. In addition, many attorneys, doctors and other professionals for whom a portable terminal unit could be useful have an aversion to utilizing keyboards, feeling that keyboards are for use by secretaries and other less qualified clerical personnel.

A further disadvantage of prior art portable terminal systems is that they normally do not contain impact printers because of the weight and bulk of such printers. Consequently, prior art terminal systems are provided with printers which form inscriptions on a small strip of paper but which cannot produce a multiple sheet business form or cannot print out a format on a conventional 8.5×11 inch piece of paper. The capacity of portable terminal systems to only print data on small strips of paper makes analysis of data entered in the terminals more difficult.

Finally, a substantial portion of the weight of existing portable terminal systems is comprised of the container in which the microprocessor and other electronic components comprising the terminal system are housed. In order to properly house and protect such components, the container is often fabricated from aluminum or other relatively strong, dense, rigid materials.

Accordingly, it would be highly desirable to provide an improved portable terminal device which would provide data input means acceptable to physicians, lawyers and other professional, would be of unusually lightweight and compact construction, would enable data to be displayed with high resolution on sheets of standard sized paper, and would permit data stored in the terminal to be displayed by projecting light on a relatively large, high resolution, collapsible screen carried in the terminal device.

Therefore, it is a principal object of the invention to provide an improved portable terminal device for on site transmission and reception of data to and from a central unit.

A further object of the invention is to provide an improved portable terminal device which provides data entry means other than conventional keyboard systems, the data entry means being generally psychologically acceptable to lawyers, physicians and other professionals to whom keyboards are unacceptable as a means for inputting data.

Another object of the invention is to provide an improved portable terminal device which includes means for printing multiple sheet business forms.

Still a further object of the invention is to provide an improved portable terminal device which includes a carrying case which is unusually lightweight and which, by effectively absorbing blows against the exterior surface of the case, prevents damage to electronic components carried in the case.

Yet another object of the invention is to provide an improved lightweight, compact portable electronic terminal device which permits data in the terminal memory to be displayed with high resolution either on a screen carried in the terminal or on a paper printout produced by the terminal.

These and other, further more specific objects and advantages of the invention will be apparent to those skilled in the art from the following detailed description thereof, taken in conjunction with the drawings, in which.

Figure 1:
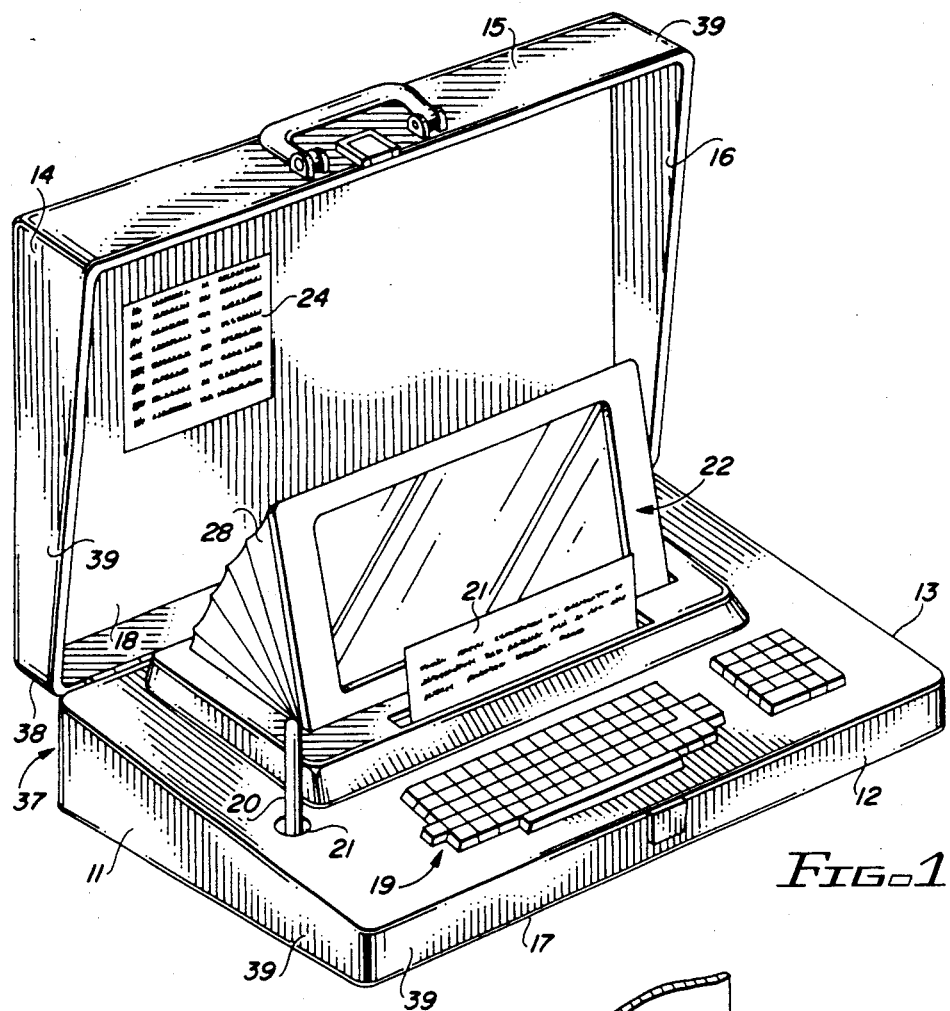
FIG. 1 is a perspective view of a portable terminal device constructed in accordance with the principles of the invention.

Briefly, in accordance with our invention, we provide an improved portable terminal device adapted to be carried to a site and to perform transaction operations by transmitting and receiving data to and from a central unit through communication means. The portable terminal device includes means for inputting transaction defining data; memory means for storing transaction defining data entered by the input means; control means coupled to the memory means for determining when sufficient transaction defining data is stored in the memory means and the terminal device is in a transaction ready state and for determining when insufficient transaction defining data is stored in the memory means for a transaction and the terminal device is in a transaction inhibit state; transmission means coupled to the memory means for transmitting selected transaction defining data stored in the memory means through the communication means to the central unit when the control means determines the terminal device is in the transaction ready state; and, a housing for the input, memory, transmission and control means. The housing includes at least one wall having an intermediate layer of plastic material, an outer and an inner layer of corrugated cardboard material, and an outer layer of tensioned resilient material adjacent and covering the outer layer of corrugated cardboard. The intermediate layer of plastic material is resilient when a force is applied against a selected area of the plastic material and the plastic material can flex to resist the force generally without permanent deformation of the plastic material, and is readily compressed and permanently deformed when a force is applied to the material and the material cannot flex to resist the force. The outer and inner layers of cardboard are biased with respect to one another. The portable terminal device can include a screen; an optical system for projecting images onto the screen; and, means coupling the control means to the optical system for transferring transaction defining data from the memory means to the optical system for display on the screen.

In another embodiment of our invention we provide an improved container. The container includes an intermediate layer of plastic material, an outer and an inner layer of corrugated cardboard material, and an outer layer of tensioned resilient material adjacent and covering the outer layer of corrugated cardboard. The plastic material is resilient when a force is applied against a selected area of the plastic material and the plastic material can flex to resist the force generally without permanent deformation of the plastic material, and is readily compressed and permanently deformable when a force is applied to the material and the material cannot flex to resist the force. The outer and inner layers of cardboard are biased with respect to one another.

Turning now to the drawings, which depict the presently preferred embodiments of the invention for the purpose of illustrating the scope of the invention, and in which identical reference characters represent corresponding elements throughout the several views, FIGS. 1 to 6 illustrate a portable terminal device including a briefcase having side walls 11–16, 37, 38 and having bottom wall 17 and top wall 18. Keyboard 19 and/or laser pen 20 are utilized to input data into the microprocessor control unit 51 or into memory 52 (FIG. 4) carried in the briefcase. Pen 20 is stored in inkwell 21. An impact printer (not visible) produces a print-out 21 of data stored in memory 52 of the control unit 51. The print-out 21 can consist of a single sheet of paper as shown or can comprise a multiple sheet business form with sheets of carbon paper interspersed between sheets of paper in the form. Data from memory 52 or data being input to control unit 51 by keyboard 19 or laser pen 20 can be reproduced on bellows screen 22 by the optical system illustrated in FIGS. 6A and 6B.

Keyboard 19 is a conventional word processing keyboard. Each key represents a particular letter, number, or punctuation mark. In addition, each key has a marking formed on the face of the key which, when tip 23 of laser pen 20 is passed over the marking, inputs the letter, number or punctuation mark of the key into the memory of pen 20.

Card 24 also includes a listing of the markings necessary to enter individual letters and numbers, including various punctuation marks and spacings and frequently utilized words and paragraphs, into the memory of laser pen 20. Alphanumeric laser pen 20 is of the general type utilized in libraries to check out books by scanning bar codes and utilized in grocery stores to scan bar codes on items of merchandise purchased at the store. Pen 20 contains its own CPU, batteries, memory and laser beam unit. When pen 20 is placed in inkwell 21 in the manner illustrated in FIGS. 1 and 2, the beam 25 is directed into recovery unit 26. Unit 26 is connected to control until 51 and memory 52 by cable 27. Control unit 51 causes unit 26 to send signals over beam 25 which direct the CPU inside pen 20 to off load data through beam 25 to recovery unit 26 and memory 52. Control unit 51 preferably includes a modem which can dial over a telephone line to send selected information from memory 52 to a central computer station and/or to receive desired information from the central computer station.

Figure 6A:
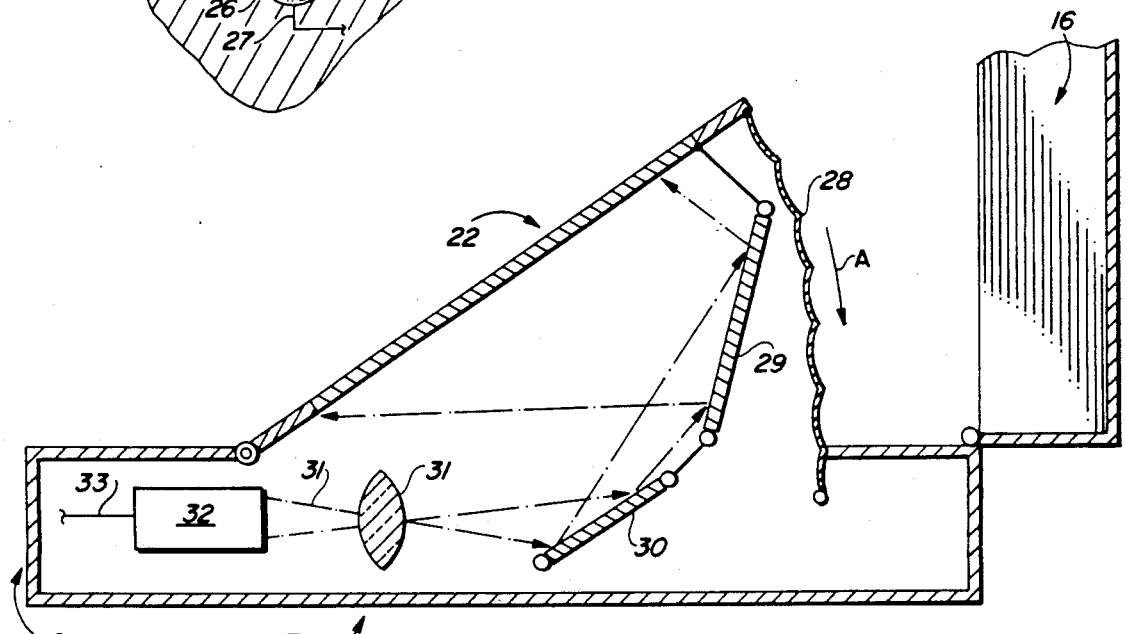
FIG. 6A is a schematic view of the portable terminal of FIG. 1 illustrating construction details of the optical projection system thereof; and, FIG. 6B is a side schematic view of the portable terminal of FIG. 1 illustrating the mode of operation of the optical projection system thereof.
Figure 6B:
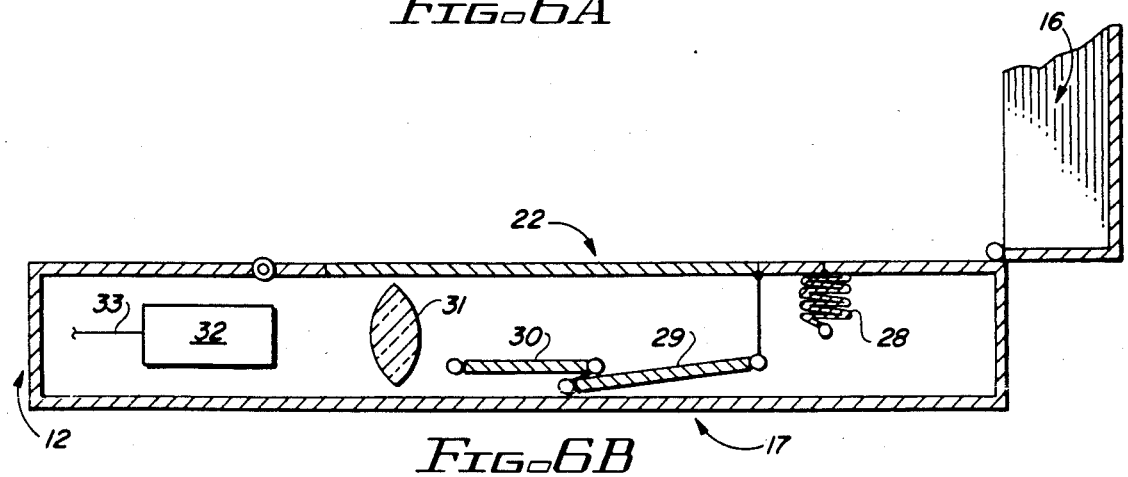
Figure 4:
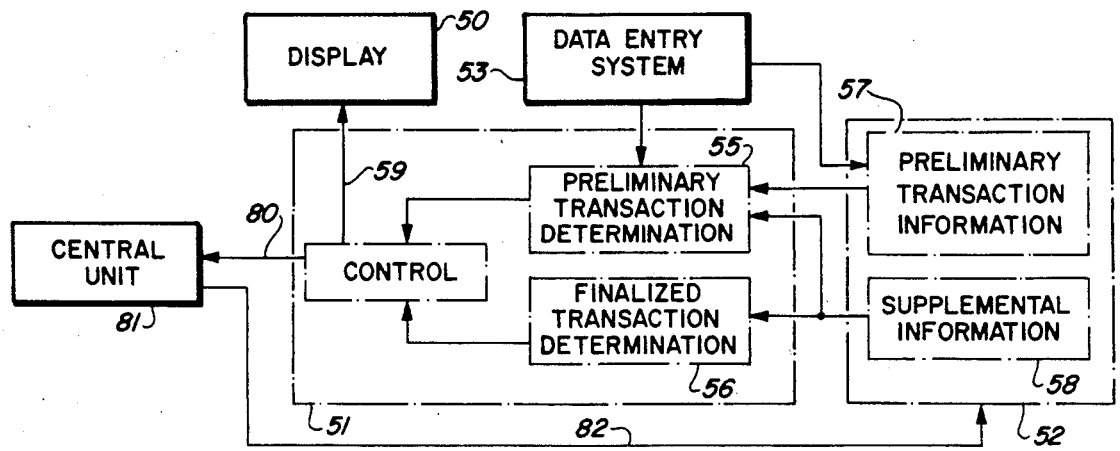
FIG. 4 is a block diagram illustrating a portable terminal constructed in accordance with the principles of the invention.
Figure 5:
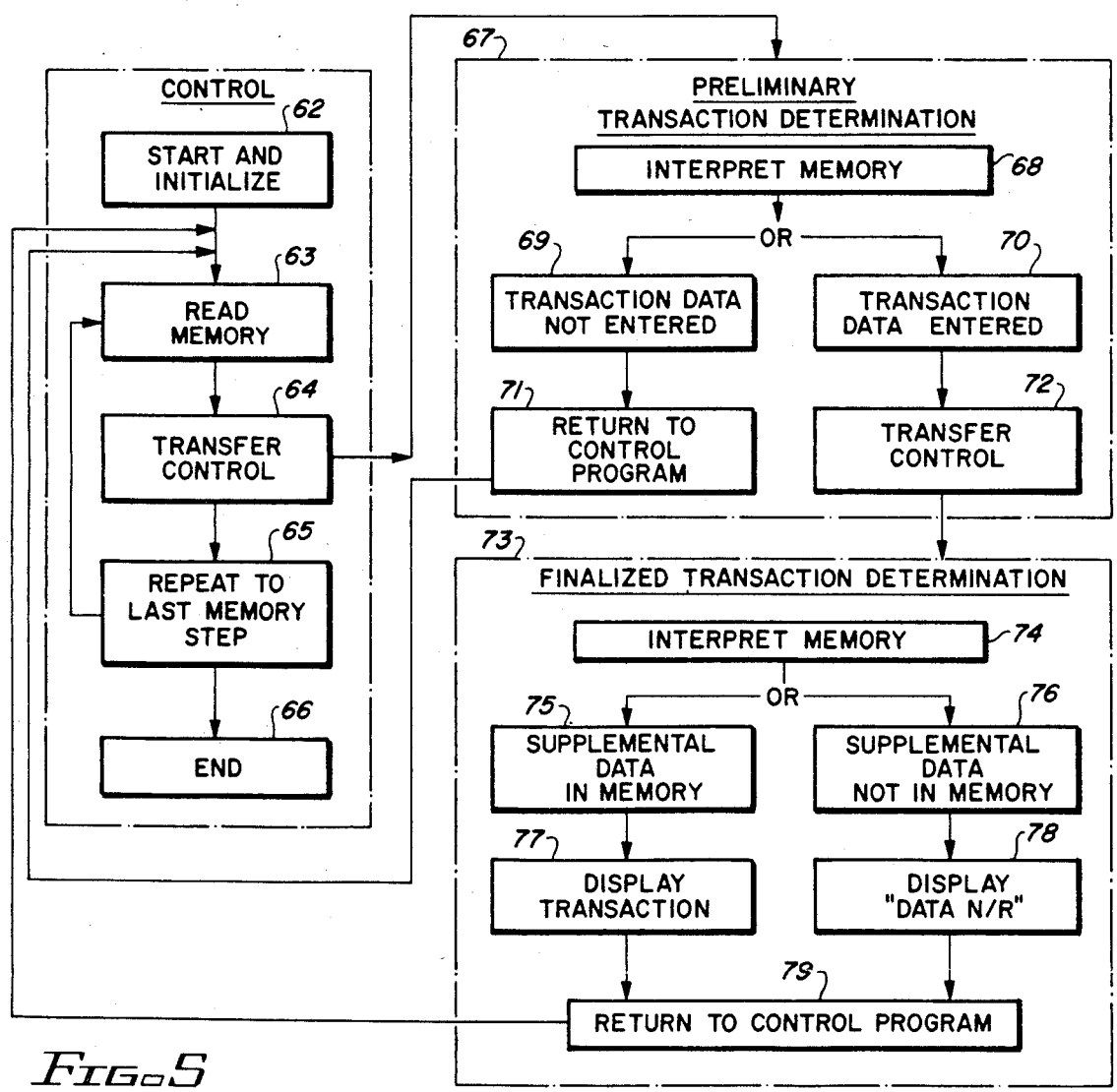
FIG. 5 is a block diagram which illustrates a typical program or logic function utilized in accordance with the presently preferred embodiment of the invention.

The optical system utilized to reproduce information on screen 22 is illustrated in FIGS. 6A and 6B and includes bellows 28 which encloses mirrors 29 and 30. Mirrors 29 and 30 area attached to the sides of screen 22 and to the briefcase such that they fold down to the positions shown in FIG. 6B when bellows 28 and screen 22 are folded down in the direction of arrow A to their storage position. When screen 22, bellows 28, and mirrors 29 and 30 are in the operative position illustrated in FIG. 6A, a light beam 31 produced by CRT (cathode ray tube) 32 passes through lens 31 and is reflected from mirrors 29 and 30 to form an image or images on screen 22 in the manner illustrated in FIG. 1. To insure that the image(s) appearing on screen 22 are upright, the CRT 32 is positioned such that the picture in light beam 31 leaving CRT 32 is upside down. When the picture passes through lens 31 it is reversed to an upright position. Cable 33 interconnects CRT 32 with control unit 51. Control unit 51 provides CRT 32 with the necessary data for producing the images contained in light beam 31. CRT 32 presently preferably has a screen with a one inch diagonal width and a weight of approximately two pounds. The small size of the CRT 32 screen insures that a clear high resolution image is produced on screen 22. The high resolution and light weight of the optical projection system make the apparatus of the invention attractive for use as a slow scan TV screen. A modem can typically receive information over a telephone line at rates in the range of 1200 bits/second to 9600 bits/-second. With these transmission rates, a picture can sometimes be sent over a telephone line to a modem in about 5 seconds. The information transmitted to a modem to describe a picture is stored in memory 52 and then transferred by control unit 51 to CRT 32 for reproduction on screen 22. Screen 22 is presently approximately twelve inches long by ten inches high.

Figure 3:
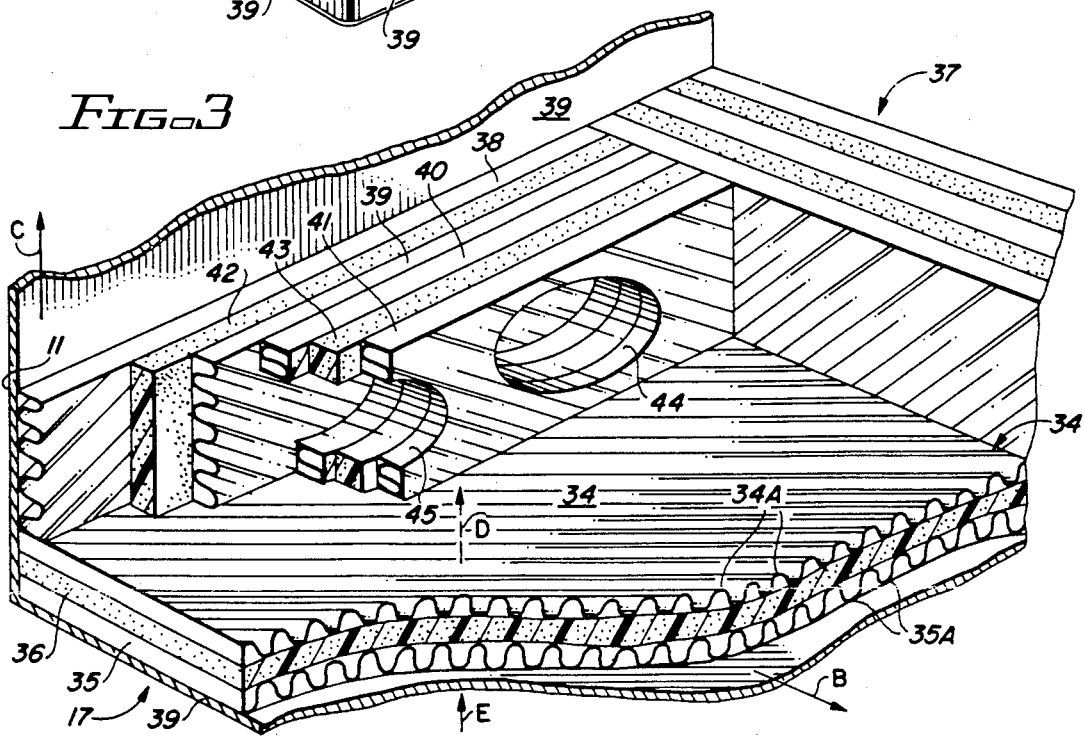
FIG. 3 is a view of a portion of the device of FIG. 1 illustrating construction details of the briefcase thereof.

The briefcase utilized to house the electronic components of the portable terminal of the invention is of unusually lightweight and strong construction. The briefcase, which is of conventional size, shape and dimension and is of the type normally carried by businessmen, weighs approximately one pound. The lightest commercially available briefcase apparently weighs four pounds. As shown in FIG. 3, the bottom 17 of the briefcase is comprised of a cardboard—plastic foam—cardboard sandwich, including upper corrugated cardboard layer 34, lower corrugated cardboard layer 35, and intermediate plastic foam layer 36. Layers 34–36 are secured to one another with a suitable adhesive. The "grains" or inner "ribs" of each corrugated cardboard layers 34 and 35 are biased with respect to and are not parallel to ribs in the other layer, i.e., while the ribs 34A in layer 34 are spaced apart and parallel to one another, the ribs in layer 34 are not parallel to the elongate ribs in layer 35. The ribs 35A in layer 35 are spaced apart and parallel to one another.

Side wall 11 is constructed in a manner similar to that of bottom wall 17, and includes corrugated cardboard layers 38–41 and plastic foam layers 42 and 43. The elongate parallel ribs or corrugations of cardboard layer 38 are biased with respect to the parallel corrugations of layer 39. The corrugations of layer 40 are biased with respect to the corrugations of layer 41. Layers 38–43 are secured to one another with adhesive. Substantial portions of layers 40, 41 and 43 are cut out to form elliptical apertures 44 and 45. When apertures 44 and 45 are cut in layers 40, 41 and 43, the weight of the layers is reduced and the remaining portions of layers 40, 41 and 43 function like ribs to further strengthen the side of the briefcase. Side walls 12–16, 37 and 38 are constructed in the same manner as wall 11. A sheet of resilient material 39, preferably leather or some other comparable plastic material, is tensioned over the outer corrugated cardboard surface layers of the briefcase. In FIG. 3, leather sheet 39 is tensioned in the directions of arrows B and C.

Biasing cardboard layers on either side of a plastic foam layer, gluing the layers together, applying a tensioned outer sheet of resilient material, and cutting out portions of the inner side wall to cause the inner side walls to function as lightweight ribs, produces a strong, extremely lightweight briefcase.

The briefcase construction illustrated in FIG. 3 cushions the electronic components carried in the briefcase from blows to the exterior surfaces of the briefcase. Conventional briefcases or carrying cases are often fabricated from metal or hard plastics which readily transmit vibrations to components carried inside the carrying case. The cardboard—foam structure of the briefcase of the invention absorbs blows to the briefcase and does not readily transmit vibrations to components carried inside the carrying case. The cardboard—foam structure of the briefcase of the invention absorbs vibrations.

When an object is impacted in the direction of arrow E (FIG. 3) against a wall, for instance bottom wall 17, of the briefcase, leather cover 39, cardboard layers 34, 35 and intermediate foam layer 36 each flex and give in the direction of arrow D to absorb the blow. When bottom wall 17 is able to upwardly flex in the direction of arrow D, wall 17 will, if the force of the blow is not too great or too localized, elastically deform and return to its normal position without any permanent deformation of wall 17. If wall 17 cannot be sufficiently displaced or flexed to plastic foam layer 36 compress to absorb the force of the dissipate the force of a blow, then cardboard layer 35 and blow. Layer 34 may also be compressed. If layers 35 and 36 are permanently compressed and an indentation is formed in these layers during dissipation of the force of a blow, outer resilient leather layer 39 generally returns to its normal position to form a smooth generally planar surface which effectively conceals the indentation formed in layers 35 and 36.

Foam layers 35, 42, 43 preferably comprise a material or plastic foam with physical characteristics identical or similar to those of styrofoam. Styrofoam will maintain a substantially rigid shape (as evidenced by a styrofoam cup), can be resiliently flexed to absorb a compressive force (as when the upper rim of a styrofoam cup is gently squeezed between the fingers of a hand to alter the shape of the rim of the cup from a circular to an elliptical contour), and can be permanently compressed to absorb a force directed against the material (as when a fingernail is pressed against the side of a styrofoam cup to form a permanent indentation therein).

During Christmas and other holidays, a sugar syrup is mixed with popped corn and edible balls are made from the syrup--popcorn mixture. These popcorn balls have compressive and strength characteristics which are similar to those of styrofoam. If sheets or panel sections are sliced from popcorn balls, such panel sections can be utilized in place of the foam layers 36, 42 and 43 in FIG. 3.

Corrugated cardboard can also resiliently absorb a blow or can be permanently indented by a blow against the cardboard. If the force of a blow is not too great, the parallel ribs or corrugation in cardboard tend to compress when impacted and resiliently expand back to their normal position after the blow. The stiffness of corrugate cardboard, when combined with the rigidity of styrofoam, contributes to forming a briefcase wall having substantial rigidity, strength and an ability to absorb the force of a blow against the wall by being resiliently compressed or displaced or by being permanently compressed or indented.

Materials other than paper or popcorn can be utilized to form structures similar or identical to those of corrugated cardboard and popcorn balls. Materials other than paper or popcorn can be utilized to form structures having a strength, compressive resistance, rigidity, and density, and weight comparable to that of styrofoam or popcorn balls.

Figure 2:
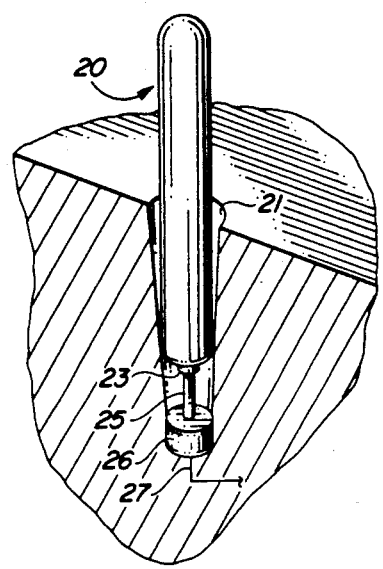
FIG. 2 is a side section view of a portion of the portable terminal device of FIG. 1 illustrating an alphanumeric laser pen and inkwell utilized to input data into the portable terminal device.

FIG. 2 is a block diagram which illustrates a preferred embodiment of the portable terminal of the present invention, the main components of which are a display 50, a controller 51 and a memory 52. A data entry system 53 is also provided. The portable terminal is utilized in conjunction with a nearby or remote central unit 81. Data entry system 53 includes keyboard 19 and laser pen 20. Display 50 includes the printout 21 and screen 22. As indicated by the dashed lines, the controller 51 performs the dual function of preliminary transaction determination 55 and finalized transaction determination 56. During preliminary transaction determination 55 controller 51 determines is sufficient preliminary transaction information 57 has been entered by data entry system 53 into memory 52 to warrant communication with central unit 81. For instance, if a solicitor is entering order information, controller 51 determines when sufficient order information has been entered, i.e., when the name and address of a customer, description of goods, cost, etc., have been entered. During the finalized transaction determination 56, controller 51 determines if sufficient supplemental information has been provided by central unit 81 or by data entry system 53 to warrant a finalized transaction determination. For example, if after sufficient preliminary transaction information 57 concerning an order had been entered and controller 51 had communicated this information to central unit 81, and central unit 81 had sent 82 supplemental information 58 confirming the order to memory 52, then controller would determine that the transaction had been finalized and cause the confirmed order to appear at display 50 via commands 59. Memory 52 contains preliminary transaction information 57 and supplemental transaction information 58. The preliminary transaction information 57 is normally entered through data entry system 53 by a solicitor at a customer site or other site. Supplemental transaction information 58 can be entered through data entry system 53 or provided by central unit 81. For example, after a solicitor utilizes data entry system 53 to enter preliminary transaction information 57 in memory 58 and controller 51 determines 55 that there is sufficient data in memory 52 for a preliminary transaction, controller 51 sends data to central unit 81. After unit 81 receives preliminary transaction information, unit 81 typically provides 82 memory 52 with supplemental transaction information 58, i.e., with an order confirmation, number of units immediately available or back ordered, etc. After controller 51 determines that sufficient data is present in memory 52 for a preliminary transaction, it generates control signals 59 to cause display 50 to produce such information by printing it on tape 21 or by displaying it on screen 22. Controller 51 also generates control signals 80 transmitting preliminary transaction information to central unit 81. After central unit 81 provides supplemental information 58 for memory 52, controller 51 determines if sufficient data is available to finalize 56 the transaction. If sufficient data is present, controller 51 generates signals 59 to print or to display on screen 22 appropriate finalized transaction information.

The data entry system 53 can, in addition to the keyboard 19 and laser pen 20 shown in FIG. 1, be any suitable system for entering alphanumeric or other data into the system circuitry.

The memory 52 can be any suitable prior art memory unit such as are commonly used in telecommunication or other types of communication and data analysis systems. For example, electromagnetic memories such as magnetic, optical, solid state, etc. or mechanical memories such as paper tape can be utilized.

Signals 80, 82 can be transmitted between control unit 51 and central unit 81 by telephone line or any other suitable prior art communication system.

FIG. 3 is a block flow diagram which illustrates a typical program or logic function which is executed by the controller 51 in determining when to generate and transmit signals 59, 80 to display 50 and to central unit 81. The basic control program 61 consists of commands to "start and initialize" 62, "read memory" 63 and "transfer control" 64 to the preliminary transaction determination sub-routine 67.

The preliminary transaction determination subroutine 67 consists of commands to "interpret memory" 68 to determine if the appropriate preliminary transaction data is "entered" 70 is "not entered" 69. "Transaction data not entered" 69 is followed by "return to control program" 71. "Transaction data entered" 70 is followed by "transfer control" 72 to finalized transaction determination subroutine 73.

The finalized transaction determination sub-routine 73 consists of command to "interpret memory" 74 to determine if supplemental transaction data is "in memory" 75 or is "not in memory" 76. When supplemental transaction data is "in memory" 75, controller 51 generates control signals 59 which can cause screen 22 or paper 21 to "display transaction" 77 in the form of appropriate selected data. If supplemental transaction data is "not in memory" 76, then controller 51 generates control signals 59 which cause screen 22 or paper 21 to "display 'data N/R'" 78, where "N/R" means "not received". The commands "display transaction" 77 and "display 'data N/R'" 78 are followed by "return to control program" 79. The control program 61, preliminary transaction determination sub-routine 67, and finalized transaction determination subroutine 73 are repeated as indicated by the "repeat to last memory step" 65 of the control program 66 followed by an "end" program step 66 which completes execution of the program.

Having described our invention in such terms as to enable those skilled in the art to understand and practice it, and having identified the presently preferred embodiments thereof, We Claim:

1. A portable terminal device adapted to be carried to a site and to perform transaction operations by transmitting and receiving data to and from a central unit through communication means, said portable terminal device comprising:
 (a) means for inputting transaction defining data;
 (b) memory means for storing transaction defining data entered by said input means;
 (c) control means coupled to said memory means for determining
   (i) when sufficient transaction defining data is stored in said memory means for a transaction and said terminal device is in a transaction ready state, and
   (ii) when insufficient transaction defining data is stored in said memory means for a transaction and said terminal device is in a transaction inhibit state;
 (d) transmission means coupled to said memory means for transmitting selected transaction defining data stored in said memory means through said communication means to said central unit when said control means determines said terminal device is in said transaction ready state;
 (e) a housing for said input, memory, transmission and control means, said housing including at least one wall having
   (i) an intermediate layer of plastic material,
   (ii) an outer and inner layer of corrugated cardboard material, and
   (iii) an outer layer of tensioned resilient material adjacent and covering said outer layer of corrugated cardboard,
  said plastic material being resilient when a force is applied against a selected area of said plastic material and said plastic material can flex to resist said force generally without permanent deformation of said plastic material, and being readily compressed and permanently deformed when a force is applied to said plastic material and said material cannot flex to resist said force, said outer and inner layers of cardboard being biased with respect to one another.

2. The portable terminal device of claim 1 including
(a) a screen;
(b) an optical system for projecting images onto said screen; and,
(c) means coupling said control means to said optical system for transferring transaction defining data from said memory means to said optical system for display on said screen.

* * * * *